US011226081B2

(12) United States Patent
Hessling-Von Heimendahl et al.

(10) Patent No.: US 11,226,081 B2
(45) Date of Patent: Jan. 18, 2022

(54) LIGHTING ARRANGEMENT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 3 days.

(21) Appl. No.: 16/700,069

(22) Filed: Dec. 2, 2019

(65) Prior Publication Data
US 2020/0191359 A1 Jun. 18, 2020

(30) Foreign Application Priority Data
Dec. 17, 2018 (EP) .................................... 18212988

(51) Int. Cl.
*B64D 47/04* (2006.01)
*F21V 7/04* (2006.01)
*F21V 7/06* (2006.01)
*F21Y 115/10* (2016.01)
*B64D 11/00* (2006.01)

(52) U.S. Cl.
CPC .............. *F21V 7/045* (2013.01); *B64D 47/04* (2013.01); *F21V 7/06* (2013.01); *B64D 2011/0053* (2013.01); *B64D 2203/00* (2013.01); *F21Y 2115/10* (2016.08)

(58) Field of Classification Search
CPC .. B64D 2011/0053; F21V 13/04; F21V 13/10
See application file for complete search history.

(56) References Cited

U.S. PATENT DOCUMENTS

| 8,740,424 B2 | 6/2014 | Hessling et al. | |
| 8,919,978 B2 * | 12/2014 | Lin | F21K 9/64 |
| | | | 362/84 |
| 2006/0061998 A1 * | 3/2006 | Coushaine | F21S 41/36 |
| | | | 362/298 |
| 2007/0297179 A1 * | 12/2007 | Leung | F21V 13/04 |
| | | | 362/296.07 |

(Continued)

FOREIGN PATENT DOCUMENTS

| DE | 3171077 | * | 5/2017 | .............. F21V 11/00 |
| EP | 2572990 B1 | | 3/2013 | |

(Continued)

OTHER PUBLICATIONS

English Machine Translation of EP 3171077 provided by ESPACENET (Year: 2017).*

(Continued)

*Primary Examiner* — Zheng Song
(74) *Attorney, Agent, or Firm* — Cantor Colburn LLP

(57) ABSTRACT

A lighting arrangement includes a light source configured for emitting light; a first reflector configured for collimating a first portion of the light emitted by the light source around a main light emission direction (D); and a second reflector arranged opposite to the light source. The second reflector is configured for reflecting a second portion of the light emitted by the light source back towards the light source for being diffusely reflected from the light source.

13 Claims, 7 Drawing Sheets

(56) References Cited

U.S. PATENT DOCUMENTS

| | | | | |
|---|---|---|---|---|
| 2010/0110677 | A1* | 5/2010 | Stein | F21V 7/005 |
| | | | | 362/235 |
| 2010/0165633 | A1* | 7/2010 | Moolman | F21V 7/0008 |
| | | | | 362/298 |
| 2011/0249445 | A1* | 10/2011 | Vasta | F21V 7/09 |
| | | | | 362/296.08 |
| 2012/0069562 | A1 | 3/2012 | Singer et al. | |
| 2013/0070449 | A1* | 3/2013 | Hu | F21V 9/38 |
| | | | | 362/231 |
| 2013/0077332 | A1* | 3/2013 | Hessling | B64D 47/06 |
| | | | | 362/470 |
| 2015/0077974 | A1* | 3/2015 | Hu | F21V 13/14 |
| | | | | 362/84 |
| 2015/0300590 | A1* | 10/2015 | Huang | F21S 41/143 |
| | | | | 362/517 |
| 2016/0046388 | A1* | 2/2016 | Jha | B64D 47/04 |
| | | | | 362/470 |
| 2018/0266656 | A1* | 9/2018 | Zhang | F21V 7/0091 |
| 2019/0011088 | A1* | 1/2019 | Kim | F21V 7/06 |

FOREIGN PATENT DOCUMENTS

| | | | | |
|---|---|---|---|---|
| EP | 3040282 B1 | 7/2016 | | |
| EP | 3171077 B1 | 5/2017 | | |
| TW | 2230439 | * | 9/2010 | F21K 99/00 |

OTHER PUBLICATIONS

European Search Report for Application No. 18212988.2, dated May 6, 2019, 7 pages.

* cited by examiner

LIGHTING ARRANGEMENT

FOREIGN PRIORITY

This application claims priority to European Patent Application No. 18212988.2 filed Dec. 17, 2018, the entire contents of which is incorporated herein by reference.

FIELD

The present invention is in the field of lighting arrangements. It in particular relates to lighting arrangements configured to be employed in aircraft lights, such as exterior aircraft lights, in particular aircraft head lights, and/or interior aircraft lights, in particular reading lights installed within the passenger cabin of an aircraft. The present invention further relates to exterior and interior aircraft lights comprising such a lighting arrangement.

BACKGROUND

Conventional lighting arrangements generate a certain amount of stray light which might be disturbing. In case of exterior aircraft lights, stray light may be a safety issue, as it may adversely affect the vision of a pilot of the aircraft due to glaring.

It therefore would be beneficial to provide an improved lighting arrangement which is capable of reducing the emission of stray light, without considerably reducing the intensity of useful light emitted by the lighting arrangement.

SUMMARY

Exemplary embodiments of the invention include a lighting arrangement comprising a light source configured for emitting light; a first reflector configured for collimating a first portion of the light emitted by the light source around a main light emission direction; and a second reflector arranged opposite to and facing the light source. The second reflector is configured for reflecting a second portion of the light emitted by the light source back towards the light source for being diffusely reflected from the light source towards the first reflector.

In a lighting arrangement according to exemplary embodiments of the invention, the second reflector blocks a second portion of light in order to prevent the generation of disturbing stray light. In contrast to a light blocking screen, which would considerably reduce the overall intensity of the light emitted by the lighting arrangement, the second reflector according to an exemplary embodiment of the invention reflects the blocked portion of light back towards the light source. Said reflected second portion of the light is then diffusely reflected by the outer surface of the light source towards the first reflector. In consequence, the reflected second portion of light is added to the first portion of light collimated by the first reflector. It therefore contributes to the amount of light emitted by the lighting arrangement, and the intensity of light emitted by the lighting arrangement is increased compared to a configuration in which the second portion of light is blocked by a light blocking screen.

As a result, a lighting arrangement according to an exemplary embodiment of the invention reduces the amount of emitted stray light substantially, without considerably reducing the intensity of the light emitted by the lighting arrangement.

The language of the reflected second portion of the light being diffusely reflected by the outer surface of the light source towards the first reflector does not necessarily mean that the second portion of light travels from the light source towards the second reflector, back to the light source, and directly to the first reflector. While this path is entirely possible, it is also possible that some light repeatedly travels back and forth between the light source and the second reflector, before reaching the first reflector. Also, it is possible that some of the second portion of the light gets lost due to absorption at the light source or other structures within the lighting arrangement. The language in question means that a significant portion of the light initially reaching the second reflector ends up being directed out of the lighting arrangement by the first reflector.

In the following, a number of embodiments comprising optional features are set out. These features may be realized in particular embodiments, alone or in combination with any of the other features.

According to an embodiment, the first reflector is an outer reflector and the second reflector is an inner reflector. The second (inner) reflector in particular may be surrounded by the first (outer) reflector. Such a configuration provides a space-saving arrangement of the first and second reflectors, resulting in a compact lighting arrangement.

According to a further embodiment, the second reflector is arranged on a light emission axis which is aligned with, i.e. extends parallel to and/or coincides with, the main light emission direction. The second reflector in particular may have a rotational symmetry with respect to said light emission axis. Such a configuration results in a very efficient lighting arrangement, in particular in a very efficient arrangement of the first and second reflectors.

According to a further embodiment, the second reflector extends over an angle of +/−20° to +/−30°, in particular over an angle of +/−25°, from the light emission axis, when viewed from the light source. Such a configuration of the second reflector results in a very efficient reduction of stray light without considerably reducing the total intensity of the light emitted by the lighting arrangement.

According to a further embodiment, the light source comprises a centrally positioned light source element, also referred to as central light source element, arranged on the light emission axis. In such a configuration, the light emission axis extends through the central light source element. Such a centrally positioned light source element allows for generating a light emission pattern having rotational symmetry with respect to the light emission axis.

According to a further embodiment, the light source comprises a plurality of light source elements. Providing a plurality of light source elements allows for increasing the intensity of the emitted light. The light source in particular may comprise a plurality of light source elements arranged in a configuration which is symmetric with respect to the light emission axis. The configuration for example may have mirror symmetry with respect to at least one plane comprising the light emission axis, or rotational symmetry, in particular an n-fold rotational symmetry, with respect to the light emission axis. Such a symmetric configuration of the light source elements allows generating a symmetric light emission pattern, in particular a light emission pattern having a (n-fold) rotational symmetry with respect to the light emission axis.

According to a further embodiment, the light source comprises at least one first light source element, configured for emitting light having a first wavelength, and at least one second light source element, configured for emitting light having a second wavelength which differs from the first wavelength. Such a configuration allows for emitting light having different wavelengths. By appropriately controlling the intensity of the first and second light source elements, the color of the emitted light may be adjusted to match the respective design criteria.

According to a further embodiment, the first reflector has a parabolic shape or an at least partially spherical shape. The first reflector in particular may comprise a plurality of portions having a spherical shape, respectively.

According to a further embodiment, the second reflector has a parabolic shape or a spherical shape. The second reflector may also comprise a plurality of portions having a spherical shape, respectively.

A parabolic shape as well as a spherical shape of the reflector(s) is well suited for generating a collimated light beam. A parabolic reflector in particular is well suited for reflecting mixed light comprising a plurality of wavelengths.

According to a further embodiment, the light source is an LED or comprises at least one LED. LEDs provide very efficient light sources having a high reliability and a long lifetime.

Exemplary embodiments of the invention further include a lighting device comprising at least one lighting arrangement according to any of the exemplary embodiments of the invention, described above. Such a lighting device allows for providing a light emission comprising only a small or even negligible portion of stray light. The additional features, modifications and technical effects, described above with respect to the lighting arrangement, apply to the lighting device in an analogous manner.

According to a further embodiment, such a lighting device is an interior aircraft lighting device, for example a personal reading light, in particular a personal reading light which is configured to be installed in a passenger cabin of an aircraft. An interior aircraft lighting device according to exemplary embodiments of the invention provides an efficient reading light emitting only a small or even negligible portion of stray light, reducing the risk that persons sitting next to the person using the personal reading light are disturbed by stray light.

According to a further embodiment, the lighting device is an exterior aircraft lighting device, in particular an exterior aircraft head light. The exterior aircraft lighting device in particular may be one of a helicopter search light, an airplane landing light, an airplane taxi light, an airplane runway turnoff light, and an airplane take-off light.

The exterior aircraft lighting device also may be a combined exterior aircraft head light including the functionalities of at least two of an airplane landing light, an airplane taxi light, an airplane runway turnoff light, and an airplane take-off light.

An exterior aircraft lighting device according to exemplary embodiments of the invention provides an efficient exterior aircraft lighting device emitting only a small or even negligible portion of stray light. An exterior aircraft lighting device according to exemplary embodiments of the invention in particular allows considerably reducing the risk of glaring a pilot of the aircraft by stray light. It may also reduce the risk of disturbing pilots of other aircraft and/or ground personnel on an airport. In consequence, the safety of the aircraft and/or the safety of airport operations is substantially enhanced.

BRIEF DESCRIPTION OF THE FIGURES

Further, exemplary embodiments of the invention are described in the following with respect to the accompanying figures.

DETAILED DESCRIPTION

Figure 1:
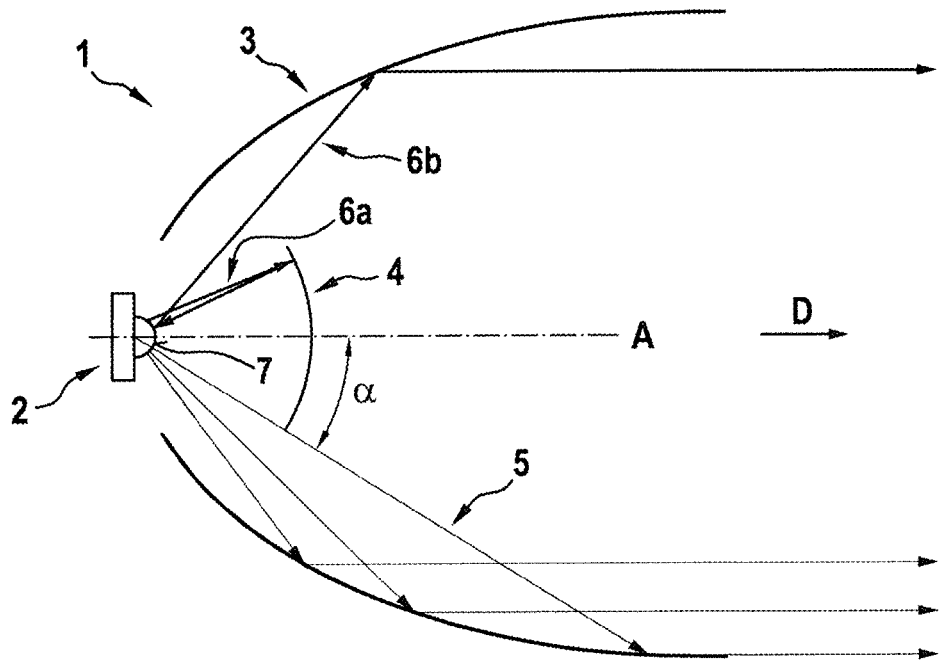
FIG. 1 depicts a schematic sectional view of a lighting arrangement in accordance with an exemplary embodiment of the invention.

FIG. 1 depicts a schematic sectional view of a lighting arrangement 1 in accordance with an exemplary embodiment of the invention.

The lighting arrangement 1 comprises a light source 2 configured for emitting light. An exemplary embodiment of the light source 2 is described in more detail further below with reference to FIG. 2.

The lighting arrangement 1 further comprises a first (outer) reflector 3 configured for collimating a first portion 5 of the light, emitted by the light source 2, around a main light emission direction D.

The light source 2 in particular may be arranged on an axis A of the first reflector 3, the axis A being aligned with the main light emission direction D, i.e. extending parallel to or coinciding with the main light emission direction D.

The first reflector 3 in particular may be a parabolic reflector centered around the axis A. The first reflector 3 also may by a spherical reflector centered around the axis A or a reflector 3 comprising a plurality of spherical portions.

The lighting arrangement 1 additionally comprises a second (inner) reflector 4 arranged opposite to the light source 2, facing the light source 2. The second reflector 4 is configured for reflecting a second portion 6a of the light, emitted by the light source 2, back towards the light source 2.

The second portion 6a of light, after being reflected by the second reflector 4 towards the light source 2, is reflected, in particular diffusely reflected, towards the first reflector 3 by an outer surface 7 of the light source 2 facing the second reflector 4. The portion of light 6b, reflected by the outer surface 7 of the light source 2, is added to the first portion 5 of the light collimated by the first reflector 3. Thus, the portion of light 6a, reflected by the second reflector 4, at least partly contributes to and thereby increases the total amount of light emitted by the lighting arrangement 1.

In a lighting arrangement 1 comprising two reflectors 3, 4 according to an exemplary embodiment of the invention, as it is depicted in FIG. 1, the amount of stray light, i.e. the amount of light emitted in another direction than the main light emission direction D, is very low and/or negligible; but the intensity of the emitted light 5, 6b is significantly larger than in a configuration in which the second portion 6a of light emitted by the light source 2 is blocked, e.g. by a light blocking screen arranged opposite to the at least one light source 2 instead of the second reflector 4.

As a result, exemplary embodiments of the invention provide lighting arrangements 1 with a high efficiency, emitting only a negligible amount of potentially disturbing stray light.

When viewed from the at least one light source 2 along the main light emission direction D, the second reflector 4 may extend over an angle α of +/−20° to +/−30°, in particular over an angle of +/−25°, from the light emission axis A. The second reflector 4 may extend symmetrically with respect to the light emission axis A. The second reflector 4 in particular may have rotational symmetry around the light emission axis A.

Figure 2:
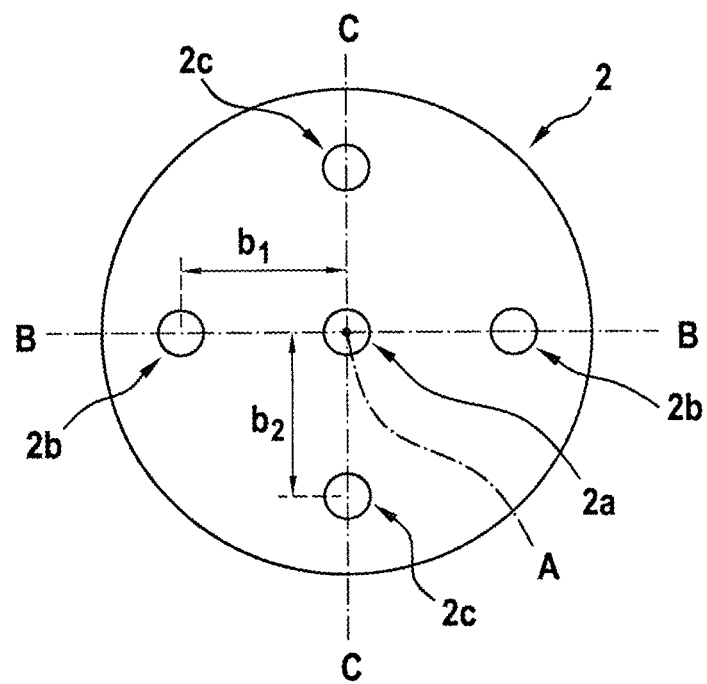
FIG. 2 depicts a schematic plan view of a light source as it may be employed in a lighting arrangement in accordance with an exemplary embodiment of the invention.

FIG. 2 depicts a schematic plan view of a light source 2, as it may be employed in a lighting arrangement 1 in accordance with an exemplary embodiment of the invention, when viewed from the second reflector 4.

The light source 2 depicted in FIG. 2 comprises a centrally positioned light source element 2a, also referred to as central light source element 2a, arranged on the light emission axis A and configured for generating a light distribution having rotational symmetry with respect to the light emission axis A.

Alternatively or additionally, the light source 2 may comprise at least one light source element 2b, 2c arranged at a distance b>0 from the light emission axis A. The light source 2 in particular may comprise a plurality of light source elements 2b, 2c arranged at some distance b from the light emission axis A. In a first configuration, all light source elements 2b, 2c may be arranged at the same distance b=b1=b2 from the light emission axis A, i.e. on a virtual circle (not shown) centered at the light emission axis A, as depicted in FIG. 2.

In an alternative configuration, at least one of the light source elements 2b, 2c may be arranged at a different distance b2 from the light emission axis A. This includes configurations in which a first group of light source elements 2b is arranged at a first distance b1 from the light emission axis A, and a second group of light source elements 2c is arranged at a second distance b2 from the light emission axis A.

The plurality of light source elements 2b, 2c may be arranged in a configuration which is symmetric with respect to the light emission axis A. The plurality of light source elements 2b, 2c in particular may be arranged in a configuration having rotational symmetry with respect to the light emission axis A. Alternatively or additionally, the configuration of the light source elements 2b, 2c may have mirror symmetry with respect to a virtual plane ("mirror plane") B, C including the light emission axis A.

In the configuration depicted in FIG. 2, the light source elements 2a, 2b, 2c are arranged in a configuration having mirror symmetry with respect to mirror planes B and C, respectively. The configuration of the light source elements 2a, 2b, 2c further has a 4-fold rotational symmetry with respect to the light emission axis A. The skilled person understands that alternative configurations (not shown) having an n-fold rotational symmetry with n being an arbitrary integer, may be employed as well.

Each of the light source elements 2a, 2b, 2c may comprise at least one LED, or may be an LED, respectively. Also, a plurality of light sources may be provided in the lighting arrangement. Each of the plurality of light sources may have one or more light source elements.

Figure 3:
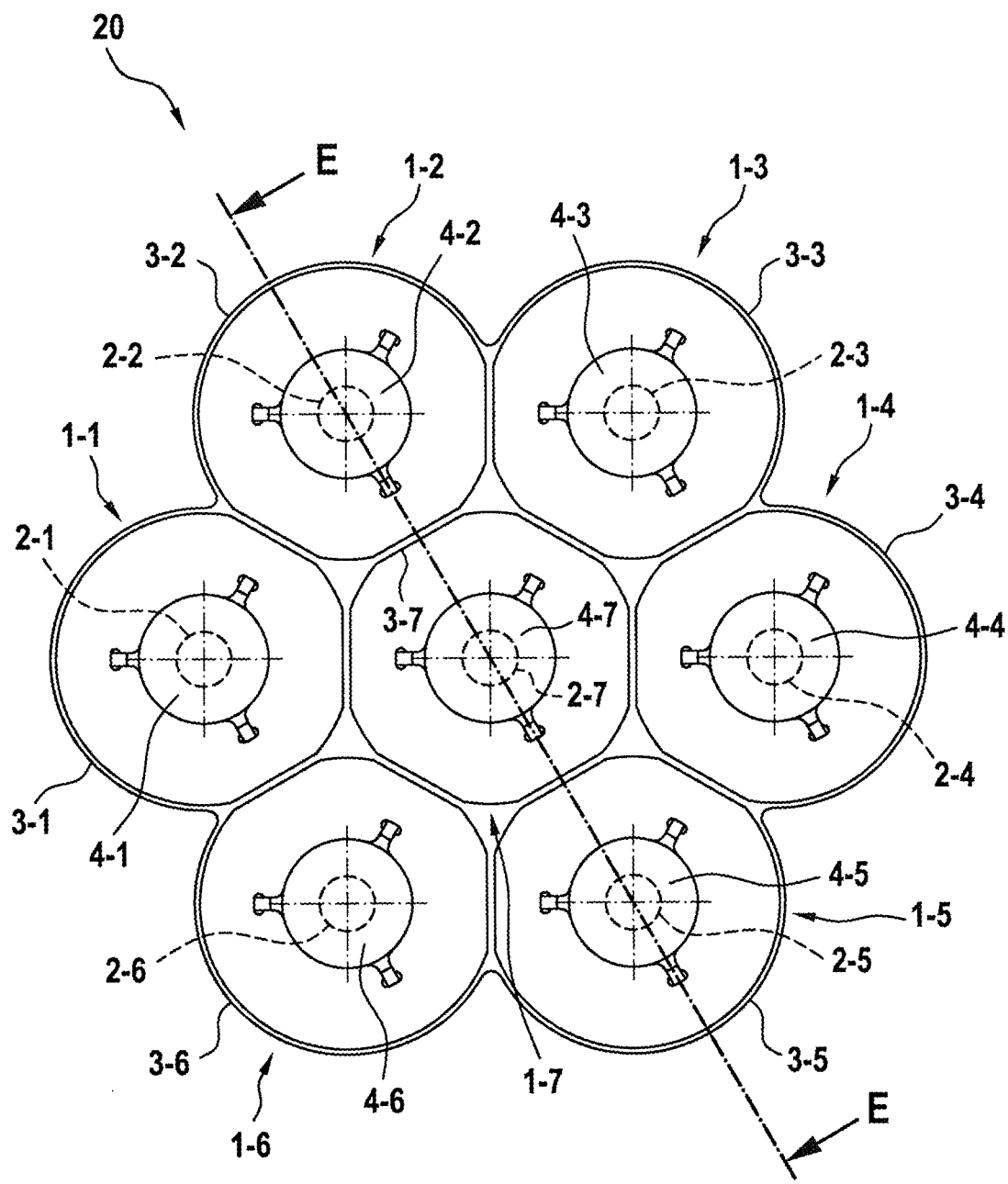
FIG. 3 depicts a planar top view of a lighting device comprising a plurality of lighting arrangements in accordance with an exemplary embodiment of the invention.

FIG. 3 depicts a planar top view of a lighting device 20 comprising a plurality of lighting arrangements 1 in accordance with an exemplary embodiment of the invention. The lighting device 20 depicted in FIG. 3 comprises seven lighting arrangements 1-1, 1-2, 1-3, 1-4, 1-5, 1-6, and 1-7. The first lighting arrangement is denoted with reference numeral 1-1, the second lighting arrangement is denoted with reference numeral 1-2, etc. In abbreviated form, the k-th lighting arrangement is denoted with reference numeral 1-k, with k being an integer between 1 and 7 (1<=k<=7). The number of seven lighting arrangements 1-1 to 1-7 is only exemplarily, and the skilled person understands that more or fewer than seven lighting arrangements 1-1 to 1-7 may be employed.

Each of the lighting arrangements 1-1 to 1-7 is constructed substantially in accordance with the embodiment of the lighting arrangement 1 depicted in FIG. 1. Each of the lighting arrangements 1-1 to 1-7 in particular comprises a light source 2-1 to 2-7, a first (outer) reflector 3-1 to 3-7, and a second (inner) reflector 4-1 to 4-7 surrounded by the outer reflector 3-1 to 3-7, respectively. In FIG. 3, the light sources 2-1 to 2-7 are depicted in phantom lines, in order to illustrate that they are arranged beneath the inner reflectors 4-1 to 4-7 in the viewing direction of FIG. 3.

In the embodiment depicted in FIG. 3, the outer reflectors 2-1 to 2-7 are parabolic reflectors 2-1 to 2-7. In order to allow for a higher packing density of the lighting arrangements 1-1 to 1-7, the outer reflectors 2-1 to 2-7 are cut off at the contact areas between adjacent lighting arrangements 1-1 to 1-7. This will be explained in more detail further below with respect to FIG. 4.

Cutting out the outer reflectors 2-1 to 2-7 at the contact areas between adjacent lighting arrangements 1-1 to 1-7 is entirely optional and may be avoided at the expense of reducing the packing density.

The first to sixth lighting arrangements 1-1 to 1-6 are arranged in a circular pattern, i.e. the centers of the first to sixth lighting arrangements 1-1 to 1-6 are arranged on a virtual circle, with the seventh lighting arrangement 1-7 being arranged in the middle of said circular pattern. In such a configuration, the seven lighting arrangements 1-1 to 1-7 constitute an overall circular arrangement, i.e. their overall structure can be circumscribed by a circular outline (not depicted in FIG. 3) touching each of the first to sixth lighting arrangements 1-1 to 1-6.

Figure 4:
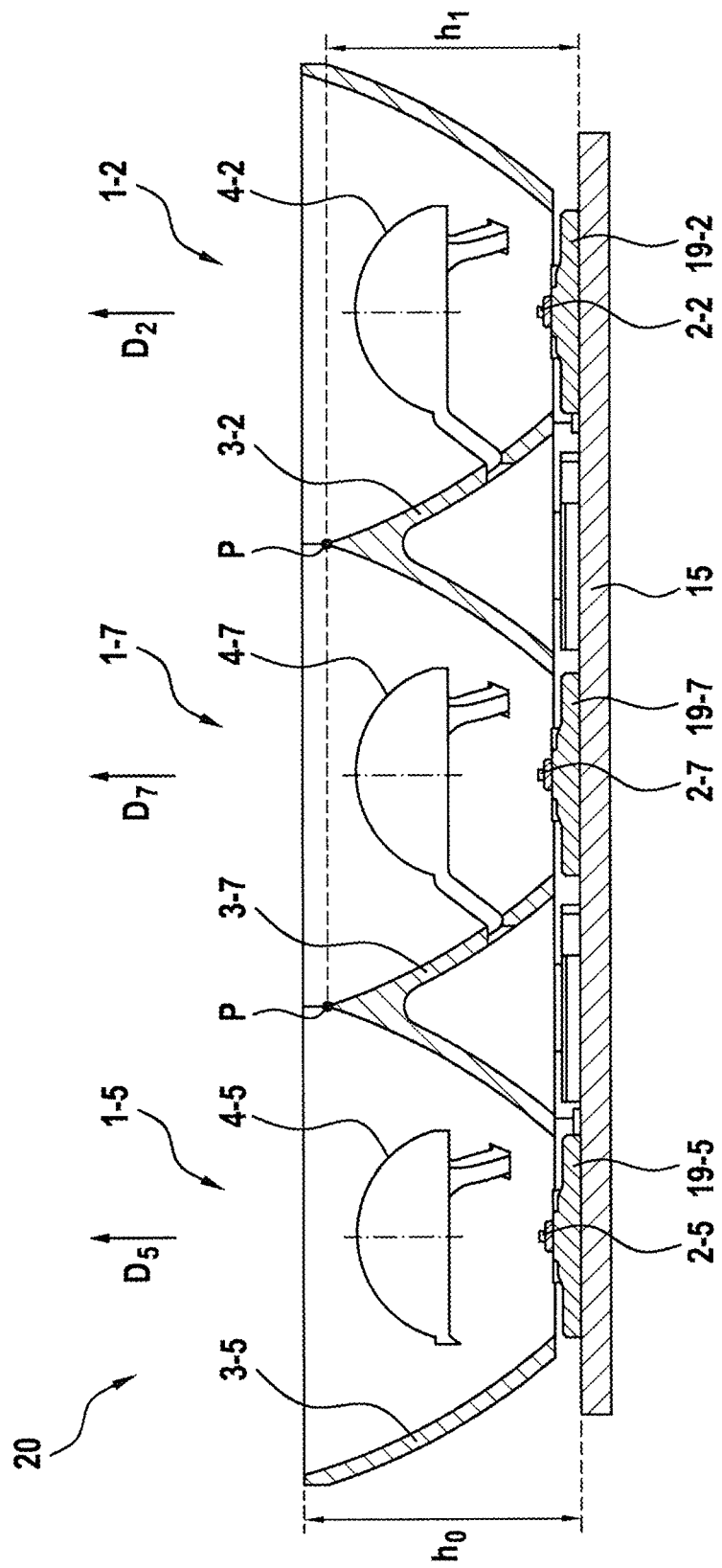
FIG. 4 depicts a cross-sectional view of the lighting device depicted in FIG. 3.

FIG. 4 depicts a cross-sectional view of the lighting device 20 of FIG. 3. The cross-sectional view is taken across the second, fifth and seventh lighting arrangement 1-2, 1-5, and 1-7, with the cutting plane and viewing direction being indicated by the letters E in FIG. 3.

FIG. 4 illustrates that the lighting arrangements 1-2, 1-5, 1-7 have a substantially identical design. The light sources 2-2, 2-5, 2-7, the outer reflectors 3-2, 3-5, 3-7 as well as the inner reflectors 4-2, 4-5, 4-7 have a corresponding arrangement with respect to each other, such that the main output directions D2, D5, D7 of the three lighting arrangements 1-2, 1-5, 1-7 are oriented substantially parallel to each other, so that they coincide in the far field. The three lighting arrangements 1-2, 1-5, 1-7 are mounted to a common base plate 15 by respective mounting structures 19-2, 19-5, 19-7.

The skilled person understands that a lighting device 20 usually includes further elements, such as a lens cover, a housing, and control and power supply circuitry. These elements are not depicted in the figures for a clear representation of the relevant features of the exemplary embodiment of the invention.

At the contact areas between adjacent lighting arrangements 1-2, 1-5, 1-7, the outer reflectors 3-2, 3-5, 3-7 of the three lighting arrangements 1-2, 1-5, 1-7 have a height extension h1. The contact areas are depicted as contact points P in the sectional view. FIG. 4 shows that the height extension h1 at the contact points P is smaller than the height extension h0 of the outer reflectors 3-2, 3-5 at the outside of the lighting device 20. This allows for a higher packing density, while the slightly reduced reflective surface of the outer reflectors 3-2, 3-5, 3-7 at the contact areas has only low/negligible influence on the collimating action of the respective lighting arrangements 1-2, 1-5, 1-7.

Figure 5:
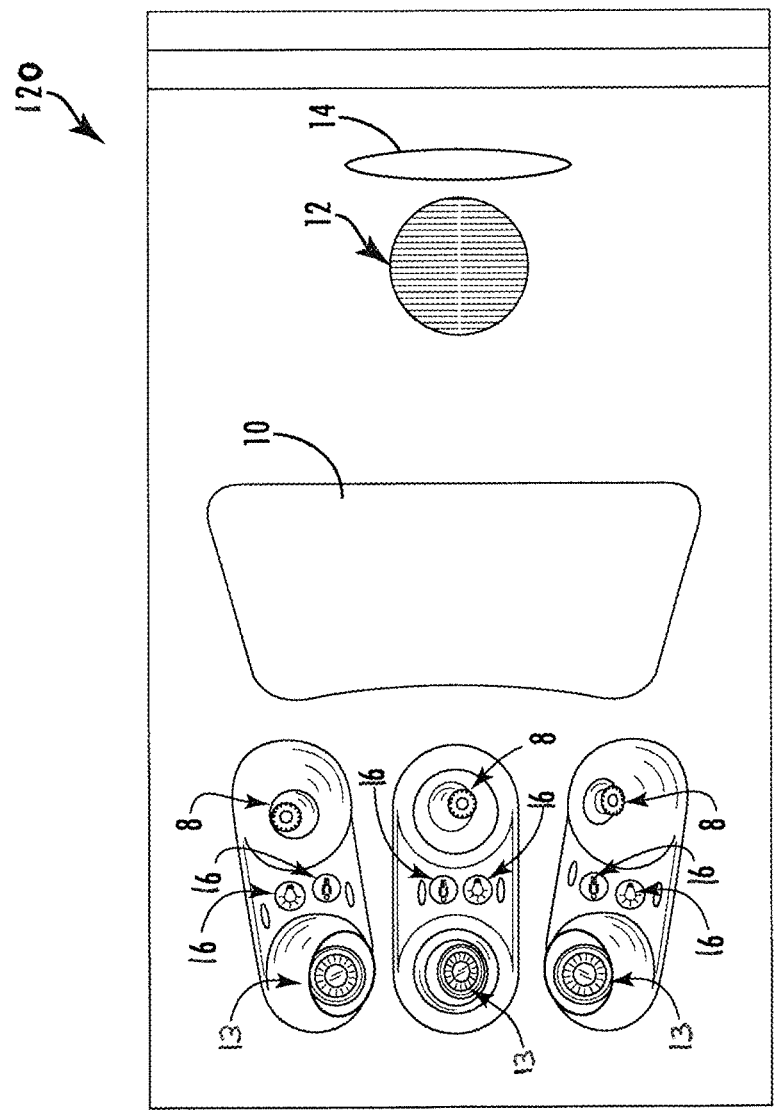
FIG. 5 depicts a schematic view of an overhead passenger service unit comprising reading lights in accordance with exemplary embodiments of the invention.
Figure 6:
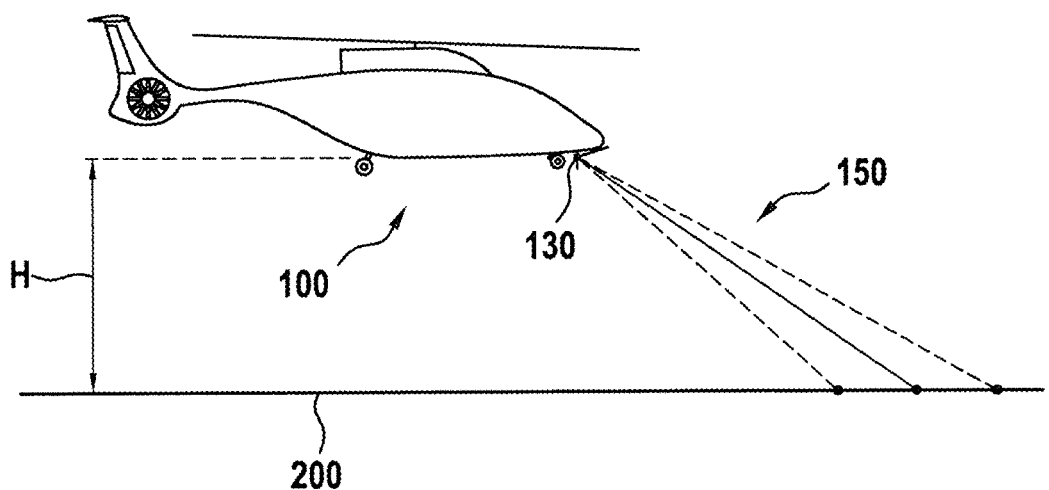
FIG. 6 depicts an aircraft, in particular a rotorcraft/helicopter, comprising an aircraft head light in accordance with an exemplary embodiment of the invention.
Figure 7:
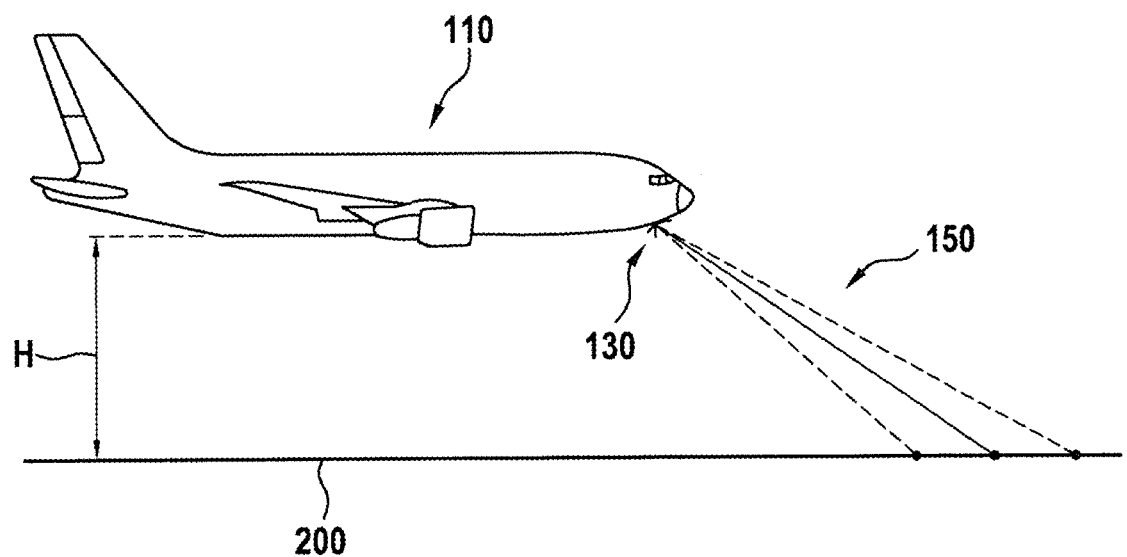
FIG. 7 depicts an airplane comprising an aircraft head light in accordance with an exemplary embodiment of the invention.

A lighting device 20 in accordance with an exemplary embodiment of the invention may be employed as a reading light 13 (see FIG. 5), such as a personal reading light in an aircraft 100, 110 (see FIGS. 6 and 7).

FIG. 5 depicts a schematic view of an overhead passenger service unit 120, as it may be installed in the passenger cabin of an aircraft 100, 110, as it is seen from the side of a passenger sitting below the overhead passenger service unit 120.

On the side depicted to the left in FIG. 5, the overhead passenger service unit 120 comprises a row of three adjustable reading lights 13 arranged next to each other in a lateral direction. Each of the reading lights 13 may comprise a lighting device 20 in accordance with an exemplary embodiment of the invention.

Six electrical switches 16 are provided to the right side of the reading lights 13, a pair of two switches 16 next to each of the reading lights 13, respectively. One of the switches 16 of each pair may be configured for switching the adjacent reading light 13, while the second switch of each pair may be configured for triggering a signal for calling cabin service personnel.

A row of three adjacent gaspers 8 arranged in the lateral direction is provided next to the switches 16. The overhead passenger service unit 120 further comprises a loudspeaker 12, a display panel 14, and a cavity 10 for housing at least one oxygen mask (not shown).

A lighting device 20 comprising at least one lighting arrangement 1-1 to 1-7 in accordance with an exemplary embodiment of the invention also may be employed as an exterior aircraft light 130 (see FIGS. 6 and 7), in particular as a helicopter search light, an airplane landing light, an airplane taxi light, an airplane runway turnoff light, and an airplane take-off light.

A lighting device 20 comprising at least one lighting arrangement 1-1 to 1-7 in accordance with an exemplary embodiment of the invention further may be employed in a combined exterior aircraft head light including the functionalities of at least two of an airplane landing light, an airplane taxi light, an airplane runway turnoff light, and an airplane take-off light.

FIG. 6 depicts an aircraft 100, such as a rotorcraft/helicopter, flying at a height H above ground 200. The aircraft 100 is equipped with an aircraft head light 130 mounted to a front bottom portion of the aircraft 100 and generating a light beam 150, which is directed downwards in front of the aircraft 100. For generating the light beam 150, the aircraft head light 120 may comprise at least one lighting device 20 as it has been described before with reference to FIGS. 3 and 4.

FIG. 7 depicts an airplane 110, flying at a height H above the ground 200. The airplane 110 is equipped with an aircraft head light 130 mounted to a front bottom portion of the airplane 110 and generating a light beam 150 which is directed downwards in front of the airplane 110. For generating the light beam 150, the aircraft head light 130 may comprise at least one lighting device 20 as it has been described before with reference to FIGS. 3 and 4.

Figure 8:
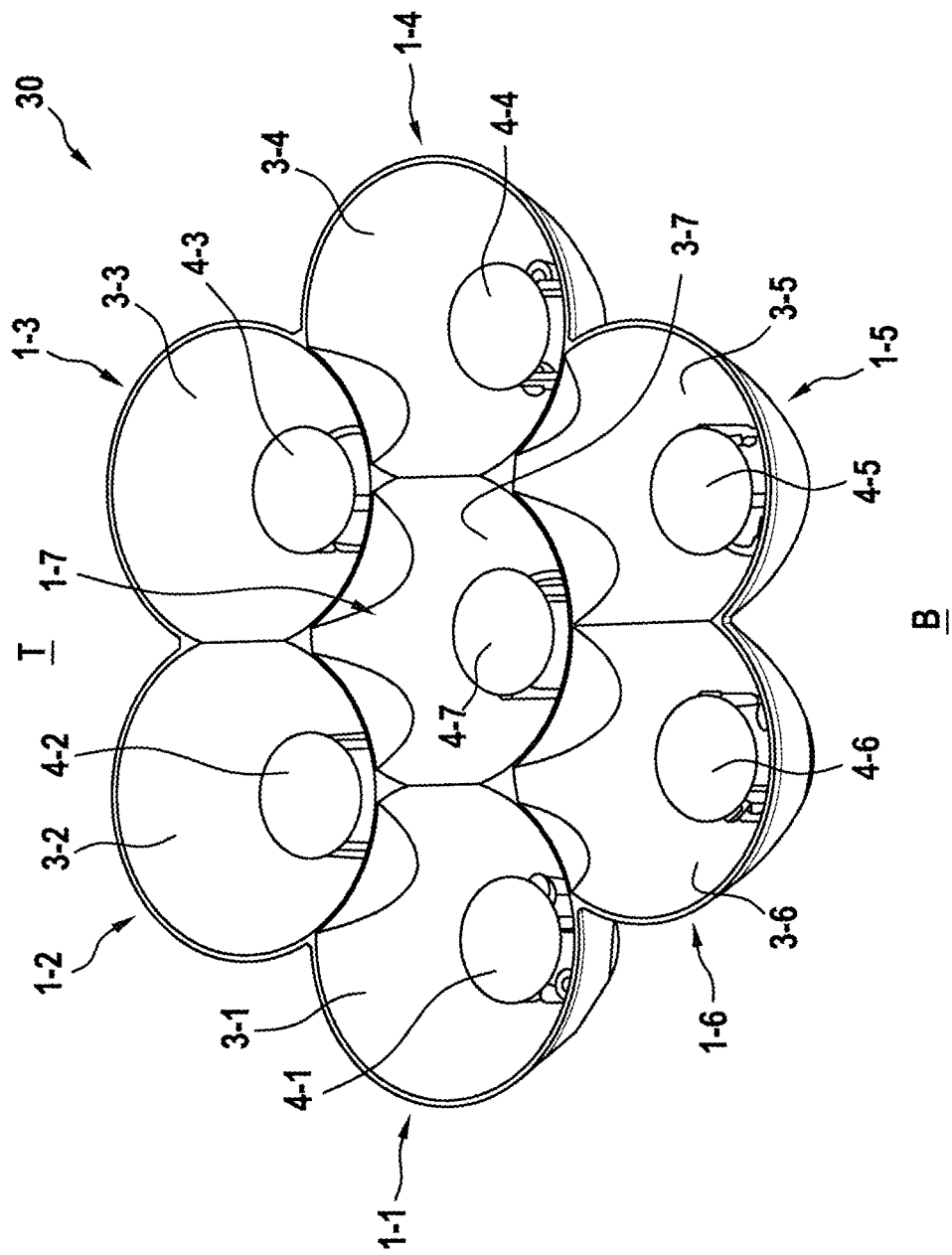
FIG. 8 depicts a perspective view of a lighting device in accordance with an alternative exemplary embodiment of the invention.
Figure 9:
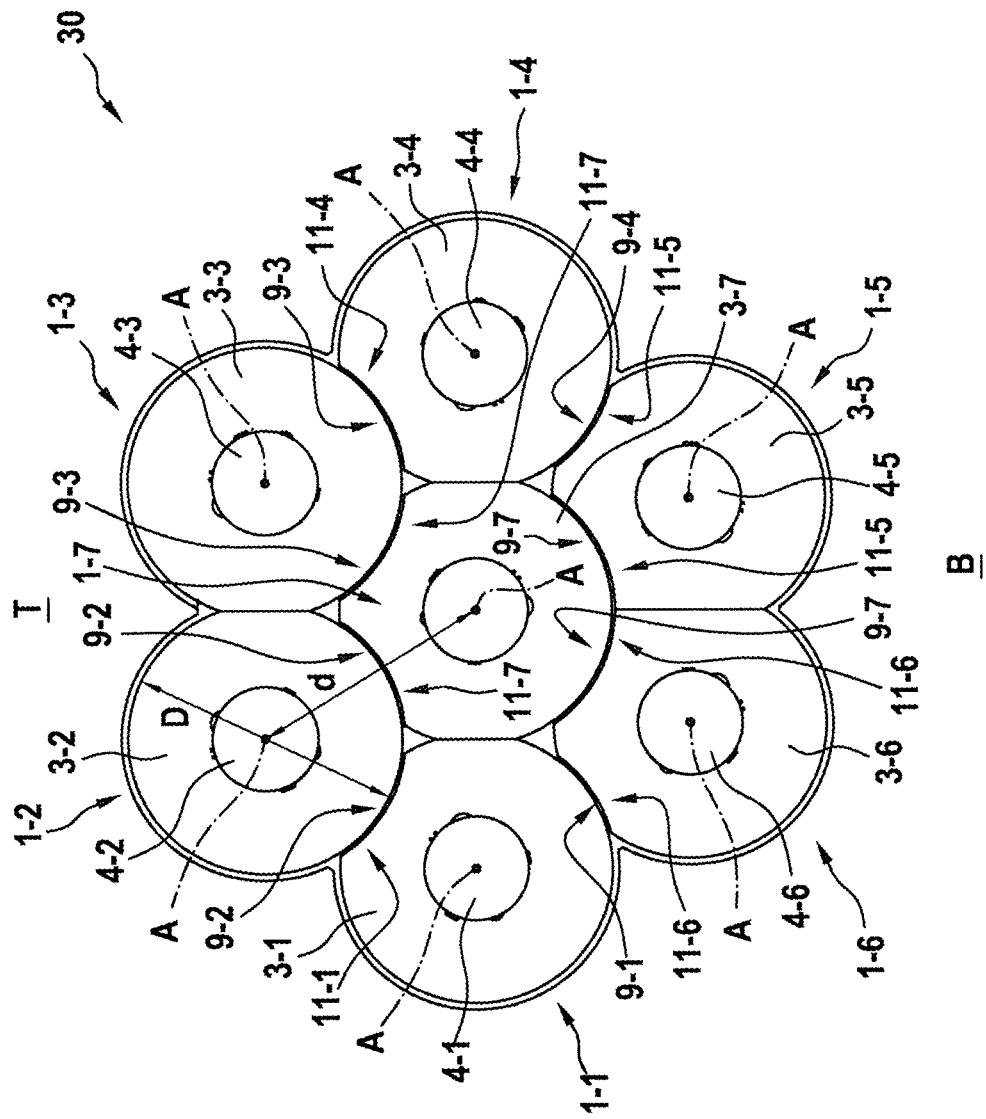
FIG. 9 depicts a plan view of a lighting device depicted in FIG. 8.

FIG. 8 depicts a perspective view of an alternative embodiment of a lighting device 30 comprising a plurality of lighting arrangements 1-1 to 1-7 according to exemplary embodiments of the invention, and FIG. 9 depicts a plan view thereof.

Similar to the embodiment depicted in FIGS. 3 and 4, the lighting device 30 depicted in FIGS. 8 and 9 includes seven lighting arrangements 1-1 to 1-7, respectively comprising a light source 2-1 to 2-7, a first (outer) reflector 3-1 to 3-7, and a second (inner) reflector 4-1 to 4-7. The light sources 2-1 to 2-7 are not visible in FIGS. 8 and 9 as they are covered by the inner reflectors 4-1 to 4-7.

As in the embodiment depicted in FIGS. 3 and 4, the number of seven lighting arrangements 1-1 to 1-7 is only exemplary, and the skilled person understands that more or fewer than seven lighting arrangements 1-1 to 1-7 may be employed.

The seven lighting arrangements 1-1 to 1-7 are arranged basically in the same configuration as in the embodiment depicted in FIGS. 3 and 4 comprising a central lighting arrangement 1-7 surrounded by six lighting arrangements 1-1 to 1-6 arranged on a virtual circle extending around the central lighting arrangement 1-7. As a result, the lighting arrangements 1-1, to 1-7 are arranged in a densely packed honeycomb structure.

The lighting arrangements in particular are arranged in a honeycomb structure comprising a first row of two lighting arrangements 1-2, 1-3, also referred to as first row lighting arrangements 1-2, 1-3 (depicted on top of FIGS. 8 and 9); a second row of three lighting arrangements 1-1, 1-7, 1-4, in particular two outer lighting arrangements 1-1, 1-4, also referred to as second row outer lighting arrangements 1-1, 1-4, and a center lighting arrangement 1-7, also referred to as second row center lighting arrangement 1-7, which is sandwiched between the two outer lighting arrangements 1-1, 1-4; and a third row of two lighting arrangements 1-5, 1-6, also referred to as third row lighting arrangements 1-5, 1-6 (depicted at the bottom of FIGS. 8 and 9).

As illustrated in FIG. 9, the lighting arrangements 1-1 to 1-7 are packed so densely that the distances d between the central axes A of adjacent reflectors 1-1 to 1-7 are smaller than the diameters D of the outer reflectors 3-1 to 3-7. In consequence, the parabolic shapes of adjacent outer reflectors 3-1 to 3-7, if not modified, would intersect with each other. Thus, the shape of at least one of every pair of adjacent outer reflectors 3-1 to 3-7 is modified in the sections, in which two adjacent outer reflectors 3-1 to 3-7, if not modified, would intersect with each other. These sections are called "reflector contact sections" 9-1, 9-2, 9-3, 9-4, 9-7, 11-1, 11-4, 11-5, 11-6, 11-7.

According to the exemplary embodiment depicted in FIGS. 8 and 9, the reflector contact section 9-2 of the outer reflector 3-2 of the second lighting arrangement 1-2 has an overall parabolic shape, whereas the shape of the reflector contact section 11-1 of the outer reflector 3-1 of the adjacent first lighting arrangement 1-1 is non-parabolic. In other words, the outer reflector 3-1 of the first lighting arrangement 1-1 is modified in the reflector contact section 11-1 compared to an overall parabolic shape. The reflector contact section 11-1 of the outer reflector 3-1 of the first lighting arrangement 1-1 is modified to a non-parabolic shape, in order to allow the corresponding outer reflector 3-2 of the second lighting arrangement 1-2 to maintain its parabolic form in the reflector contact section 9-2.

The skilled person understands from FIGS. 8 and 9 that the modification of the reflector contact sections 9-2, 11-1, as it has been described exemplarily with respect to the pair of first and second light arrangements 1-1, 1-2, is also applied to other pairs of adjacent lighting arrangements 1-1 to 1-7, depicted FIGS. 8 and 9.

FIGS. 8 and 9 in particular illustrate that a lighting arrangement 1-1, 1-4, 1-7, which is part of a first pair of lighting arrangements as a lighting arrangement 1-1, 1-4, 1-7 having a non-parabolic reflector contact section 11-1, 11-4, 11-7, at the same time may be part of another pair of lighting arrangements as a lighting arrangement 1-1, 1-4, 1-7 having a parabolic reflector contact section 9-1, 9-4, 9-7.

The viewing plane of FIG. 9 is parallel to a light emission plane, which is oriented orthogonal to the central axes (light emission axes) A of the light arrangements 1-1 to 1-7.

In the configuration depicted in FIGS. 8 and 9, the outer reflectors 3-1 to 3-7 are formed such that the non-parabolic reflector contact sections 11-1, 11-4, 11-7 of the outer reflectors 3-1, 3-4, 3-7 are closer to a lower side B of said light emission plane than the respectively adjacent parabolic reflector contact sections 9-2, 9-3 of the adjacent outer reflectors 3-2, 3-3.

In other words, in the embodiment depicted in FIGS. 8 and 9, for each outer reflector 3-1, 3-4, 3-7 having at least one parabolic reflector contact section 9-1, 9-4, 9-7 and at least one non-parabolic reflector contact section 11-1, 11-4, 11-7, the at least one non-parabolic reflector contact section 11-1, 11-4, 11-7 is arranged closer to the upper side T of the light emission plane than the at least one parabolic reflector contact section 9-1, 9-4, 9-7, which is arranged closer to the lower side B of the light emission plane.

As a result of such a configuration, stray light generated due to the non-parabolic shape of the non-parabolic reflector contact sections 11-1, 11-4, 11-5, 11-6, 11-7, is reflected towards the second (lower) side B, and (almost) no stray light is reflected to the first (upper) side T.

Thus, in case a lighting device 30 having a configuration as depicted in FIGS. 8 and 9 is mounted to an aircraft 100, 110 (see FIGS. 6 and 7), in particular as an aircraft head light 130 with the lighting arrangements 1-1 to 1-7 being arranged in the same orientation as depicted in FIGS. 8 and 9, i.e. with the first (upper) side T being the top side of the aircraft head light 130 when mounted to the aircraft 100, 110, (almost) no stray light is emitted upwardly, i.e. above a horizontal plane extending through the aircraft head light 130. Instead, any stray light generated due to the non-parabolic shape of the non-parabolic reflector contact sections 11-1, 11-4, 11-5, 11-6, 11-7 is emitted only downwards towards the ground 200, and the risk of glaring a pilot of the aircraft 100, 110 by stray light is considerably reduced.

In this way, the reduction of stray light via the second reflectors 4-1, 4-2, 4-3, 4-4, 4-5, 4-6, 4-7, as described above, can be further reduced. It is pointed out that the described combination of parabolic and non-parabolic reflector contact sections is exemplary only and that other configurations of the first reflectors are possible as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A lighting device comprising at least one lighting arrangement, wherein the at least one lighting arrangement includes:
   a light source configured for emitting light;
   a first reflector having a parabolic shape or an at least partially spherical shape and defining a light collimation space and configured for collimating a first portion of the light, which is emitted by the light source into the light collimation space, around a main light emission direction; and
   a second reflector arranged within the light collimation space opposite to the light source and configured for reflecting a second portion of the light emitted by the light source back towards the light source for being diffusely reflected from the light source, wherein the second reflector is arranged on a light emission axis, which is aligned with the main light emission direction, and wherein the second reflector has rotational symmetry around the light emission axis;
   wherein the light source is supported by a mounting structure, which is arranged outside the light collimation space, wherein the light source is located in an opening of the first reflector, and wherein the light source is located substantially at a position where the light emission axis would intersect with the parabolic shape or with the at least partially spherical shape of the first reflector in the absence of the opening in the first reflector; and
   wherein the lighting device is an exterior aircraft lighting device or an interior aircraft lighting device.

2. The lighting device according to claim 1, wherein the light source comprises a plurality of light source elements.

3. The lighting device according to claim 2, wherein the plurality of light source elements comprises at least one first light source element configured for emitting light having a first wavelength, and at least one second light source element configured for emitting light having a second wavelength which differs from the first wavelength.

4. The lighting device according to claim 2, wherein the plurality of light source elements are arranged in a configuration which is symmetric with respect to the light emission axis.

5. The lighting device according to claim 1, wherein the lighting device is an exterior aircraft head light.

6. The lighting device according to claim 5, wherein the lighting device is one of a helicopter search light, an airplane landing light, an airplane taxi light, an airplane runway turnoff light, and an airplane take-off light or a combined exterior aircraft head light including the functionalities of at least two of a an airplane landing light, an airplane taxi light, an airplane runway turnoff light, and an airplane take-off light.

7. The lighting device according to claim 1, wherein the second reflector is surrounded by the first reflector.

8. The lighting device according to claim 1, wherein the second reflector extends over an angle (α) of +/−20° to +/−30°.

9. The lighting device according to claim 1, wherein the light source comprises a centrally positioned light source element arranged on the light emission axis.

10. The lighting device according to claim 1, wherein the second reflector has a spherical or an at least partially spherical shape.

11. The lighting device according to claim 1, wherein the light source (2) is an LED or comprises at least one LED.

12. The lighting device according to claim 1, wherein the lighting device is a personal reading light.

13. An aircraft including:
a lighting device according to claim 1.

* * * * *